Nov. 8, 1966  L. STRIEBIG  3,283,790
SAWING JIGS FOR CUTTING BUILDING PANELS
Filed Nov. 16, 1964  4 Sheets-Sheet 1

United States Patent Office 3,283,790
Patented Nov. 8, 1966

3,283,790
SAWING JIGS FOR CUTTING BUILDING PANELS
Ludwig Striebig, c/o Schreinerei-Maschinen, Grossmatte 26, Littau, Lucerne, Switzerland
Filed Nov. 16, 1964, Ser. No. 411,210
Claims priority, application Switzerland, Apr. 23, 1964, 5,303/64
4 Claims. (Cl. 143—47)

The present invention relates to a sawing jig for cutting building panels of major dimensions to size and for cutting rectangular openings into the same. Such an arrangement has been described by the present applicant in Swiss patent application No. 3275/61. This sawing jig comprises an upright frame with a horizontal bottom rail, an upper rail parallel thereto, and uprights connecting the two rails together. The bottom horizontal rail is provided with forwardly projecting carrier arms for supporting the building panels that are to be cut, whereas the upper horizontal rail serves for guiding a roller carriage to which the upper end of a guide beam extending parallel to the upright members of the frame is attached, the bottom end of the beam being guided along a horizontal member at the foot of the frame. The beam carries a movable slide locatable by locking means and carrying a motor-driven circular saw in such a way that the saw can make vertical saw cuts by movement of the slide up or down the guide beam and horizontal saw cuts by horizontal traverse of the guide beam whilst the slide is locked in position. The upright members of the frame are provided along their entire length with exchangeable fitted, forwardly projecting pegs for supporting the building panel. It is a drawback of these pegs that when the saw cuts the panel it necessarily also cuts through the pegs. Although this can be avoided when the saw makes a vertical cut, because the roller carriage and the guide beam for the motor-driven circular saw can be locked in a position between two upright struts fitted with pegs, it is in practice impossible to avoid cutting the pegs when the saw makes a cut in the horizontal direction.

It is an object of the present invention to eliminate this drawback of sawing jigs of the above described kind. To this end the invention proposes to dispense with the method of supporting the building panels by pegs on stationary upright struts and instead to provide an elevationally movable trellis comprising horizontal battens, said trellis being positively raisable in the plane of the trellis by motion transmitting means operable by the inward deflection of the motor-driven circular saw required for making a horizontal cut, whenever the blade of the circular saw happens to be in elevational alignment with a batten of the trellis and would damage the same when performing the intended cut.

Figure 1:
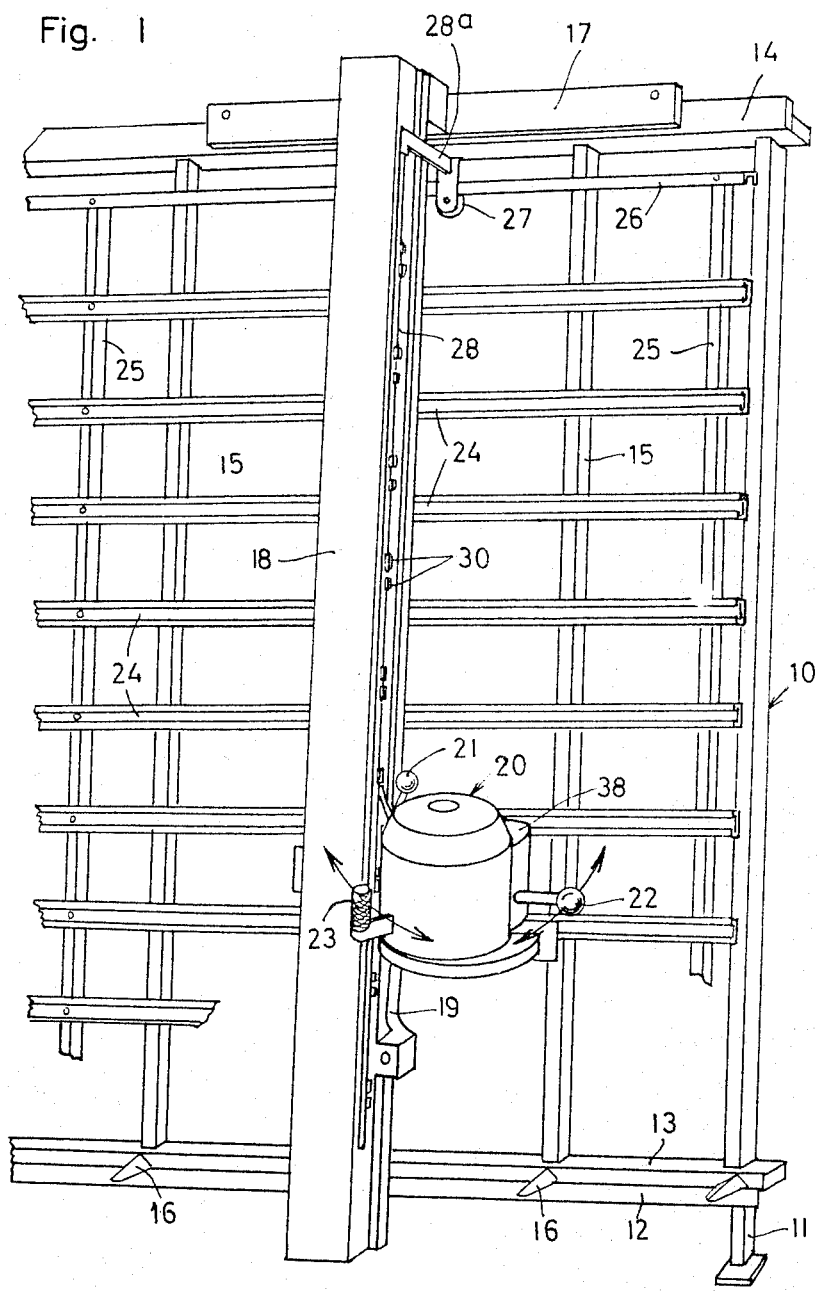
Figure 2:
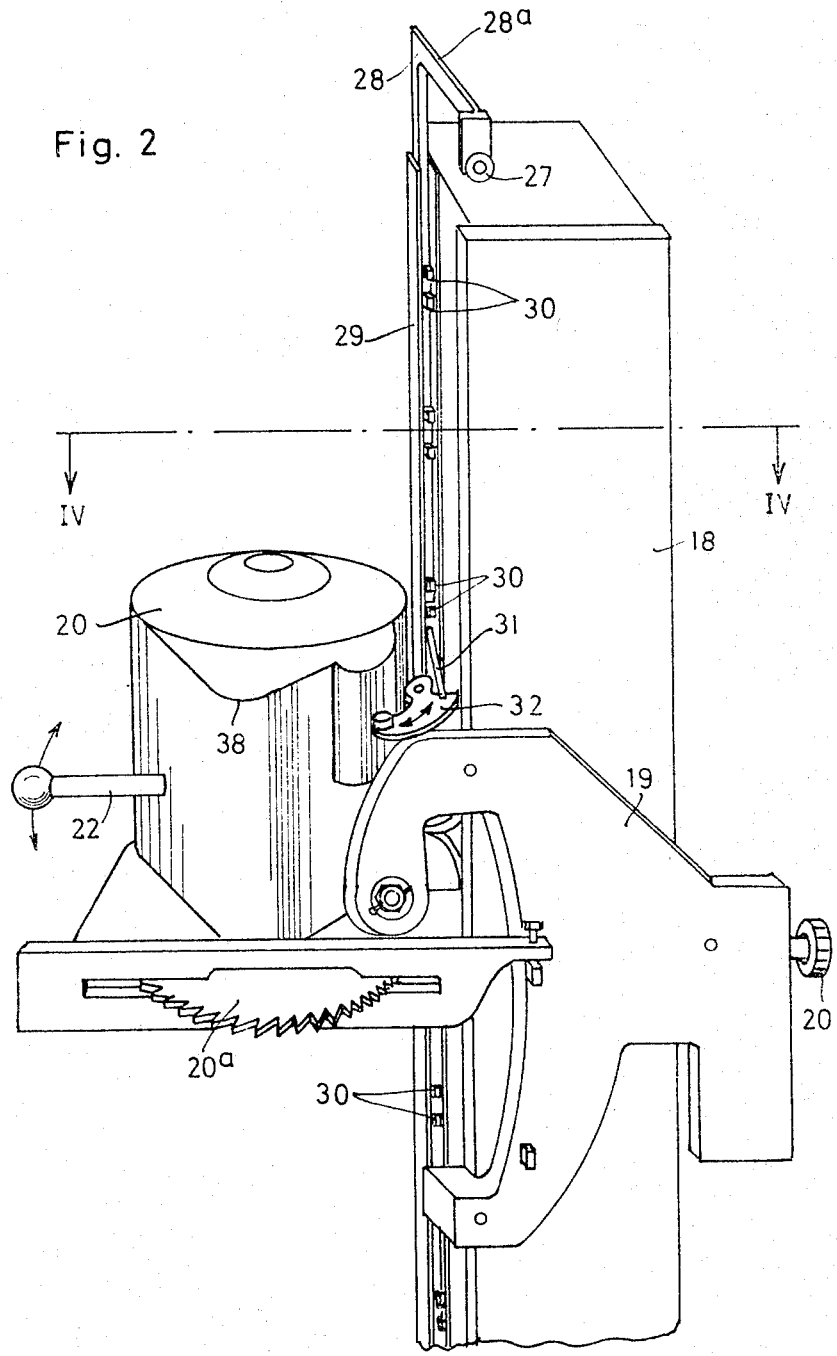
Figure 3:
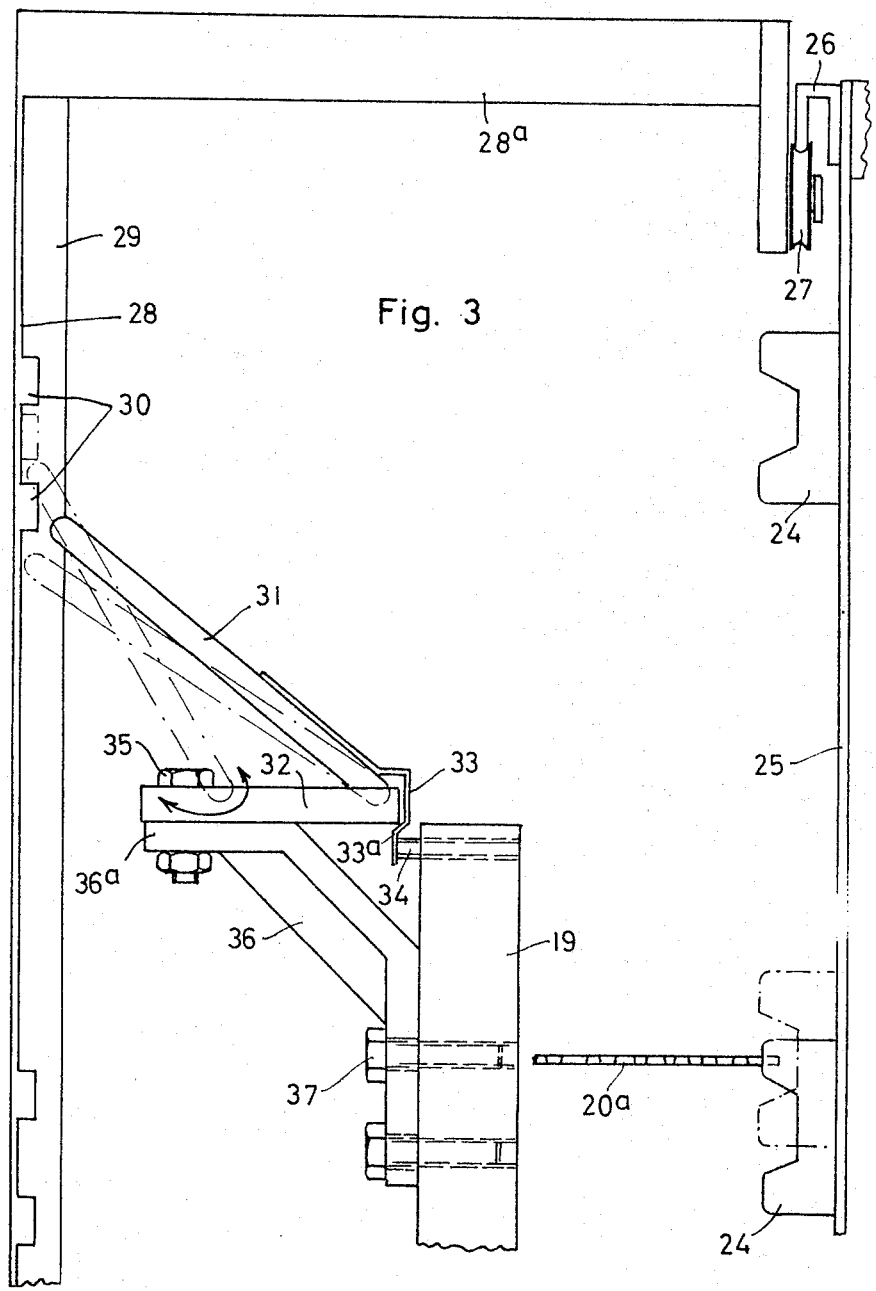
Figure 4:
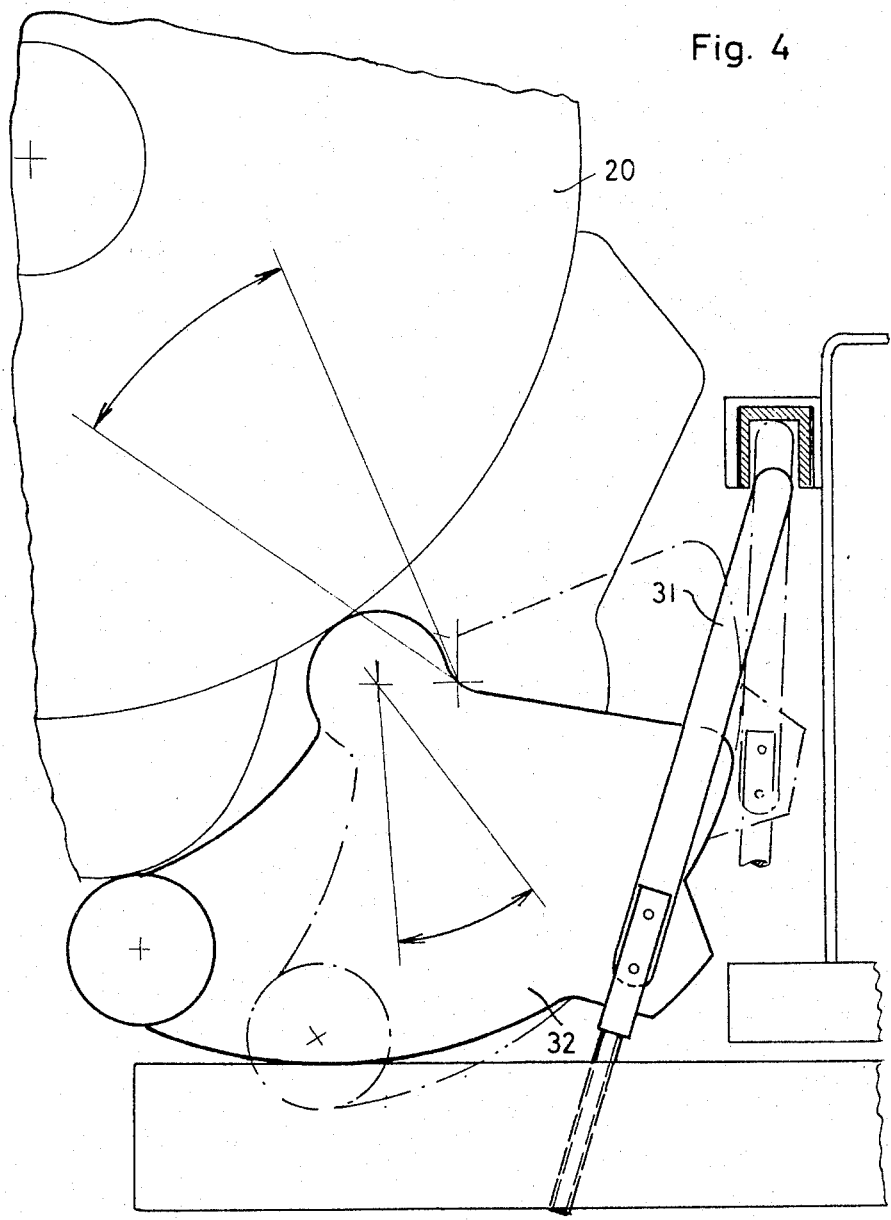

An embodiment of a sawing jig in accordance with the invention will now be described, by way of example, with reference to the accompanying drawings, in which FIGURE 1 is a perspective view from the front of the saw cutting jig, the left hand end of the jig being broken away, FIGURE 2 is a perspective view from the side of the upwardly extending guide beam which elevationally movably carries a slide supporting a motor-driven circular saw lockable in either of two working positions, FIGURE 3 shows the transmission means for lifting the supporting trellis, and FIGURE 4 is a section taken on the line IV—IV in FIGURE 2.

The jig for cutting building panels of major size to shape and for cutting rectangular openings into the same, as illustrated in FIGURES 1 to 4, substantially consists of a vertical frame 10 (FIGURE 1) mounted on a lower horizontal member 12 standing on feet 11. The frame comprises a lower horizontal rail 13, an upper rail 14 parallel thereto and vertical members 15 connecting the rails. The rail 13 is provided with forwardly projecting carriers 16 upon which the bottom edge of an upended building panel can be rested. The upper rail 14 forms a guideway for a roller carriage 17 from which a vertical guiding beam 18 extends downwards parallel to the vertical side members 15 of the frame, the bottom end of said beam being guided along the lower horizontal member 12. A slide 19 (see FIGURE 2) is adapted to move up and down the side of beam 18 and to be located in any desired elevational position by a clamping screw 20. Mounted on the slide 19 is a motor-driven circular saw 20 which can be tilted from a position in which the motor shaft is horizontal and the circular saw blade 20a makes a vertical cut, into a position in which the motor shaft is vertical and the circular saw blade makes a horizontal cut. A locking lever 21 permits the motor-driven circular saw 20 to be securely locked in either one of these two working positions. For tilting the circular saw 20 from one position into the other a handle 22 is provided. When the motor-driven circular saw is in position for making a horizontal cut (see FIGURE 1) the teeth of the blade 20a of the circular saw are laterally slightly offset from the surface of the panel that is to be cut. For making a horizontal cut the circular saw 20 must therefore be tilted slightly inwards. This can be done by means of a second handle 23.

For adjustably locating the building panel a supporting trellis is elevationally adjustably mounted on the front of frame 10. This trellis comprises horizontal wooden channeled battens 24 attached to vertical struts 25. The uppermost horizontal batten is replaced by a U-section rail 26 placed with its flanges pointing downwards and a roller 27 (see FIGURE 3) is adapted to ride on the edge of the front flange of this rail. The roller 27 is rotatably mounted on the end of an inwardly projecting bracket arm 28a on a lifting bar 28 slidable in a U-section guide rail 29. The guide rail 29 is attached to one side of the guide beam 18. The lifting bar 28 is provided at equidistant intervals with pairs of projections 30 which cooperate with a lifting finger 31 (FIGURES 2, 3 and 4).

The lifting finger 31 is mounted on a quadrant 32 adapted to swivel about a vertical axis and normally rests on the quadrant at an angle of inclination. The lower end of the finger engages a recess in the swivelling quadrant 32 and this end of the finger carries a narrow repeatedly offset retainer 33 of which the downward terminal portion 33a cooperates with an adjustable stop pin 34 (FIGURE 3) on part of slide 19 when the swivelling quadrant is in a particular position. The upper end of the lifting pin 31 is thus freely held in an upwardly sloping position. The vertical axis about which the quadrant 32 is adapted to swivel is constituted by a pin 35 which simultaneously serves for securing the quadrant to a horizontal part 36a of a supporting bracket 36 attached to slide 19 by bolts 37.

The motor casing of the circular saw 20 is formed with a bulbous projection 38 which imparts a swivel motion to quadrant 32 when the saw 20 is in a position in which it presents the blade 20a to the panel for performing a horizontal cut. The terminal portion 33a of retainer 33 in this position ceases to be supported by pin 34 and therefore allows the upper end of the lifting finger 31 to fall against the side of the lifting bar 28. If the blade 20a of the circular saw should happen to be in elevational alignment with one of the flanges of a batten 24 of the supporting trellis, as indicated at the bottom right hand side in FIGURE 3, then inward deflection of the motor-driven circular saw 20 will cause the released lifting finger 31 to engage the underside of the nearest projection 30 and thereby to lift the lifting bar 28 and through the action of roller 27 the entire trellis, removing the batten from the line of action of the circular saw blade 20a so that it will not be cut by the blade when this bites horizontally into the panel. Naturally the arrangement must be such that the trellis will perform this movement in the plane of the trellis whenever the danger arises of one of the battens being damaged when the saw makes a horizontal cut. To this end the spacing of the projections 30 of each pair corresponds to the distance between the two flanges of a batten 25 and the spacing of adjacent pairs of projections corresponds to the spacing of two consecutive battens 25. Moreover, the lifting bar 28 and its projections, on the one hand, and the horizontal battens 24 of the trellis on the other hand must be elevationally correctly placed in relation to each other to ensure that whenever the saw blade 20a of the motor-driven circular saw 20, locked on the guiding beam 18 in a given elevational position, happens to be facing a flange of one of the battens 24, the lifting finger which is released by the inward deflection of the circular saw 20 will engage a cooperating projection 30 on the lifting bar 28 when the inward deflection of the circular saw is continued and thus slightly lift the trellis to withdraw the batten which is endangered by the saw blade 20a from the working range of the blade and prevent it from being cut.

It will be understood from the above explanations that the quadrant 32 and the lifting finger 31 are motion transmitting means for translating an inward deflection of the circular saw 20 into a lifting motion of bar 28 which in turn is adapted by roller 27 to lift the trellis. When the panel is then cut by traverse of the guide beam 18 in the horizontal direction, the supporting trellis behind the panel will be lifted before the beam 18 is traversed, thus removing the endangered batten out of range of the blade 20a. As already mentioned above, a similar arrangement is not required when making vertical cuts because this operation is always performed when the guide beam 18 is in predetermined locked positions of traverse in which the battens are vertically slotted so that they cannot be damaged by the teeth of the circular saw 20 which must naturally be firmly secured in this working position.

What I claim:

1. A sawing jig for cutting building panels of major size to shape and for cutting rectangular openings into the same, comprising an upright frame consisting of a horizontal frame member at the bottom provided with forwardly projecting carriers for supporting the panel that is to be cut, a roller carriage guided along a horizontal frame member at the top, said carriage carrying a guide beam extending vertically downwards and permitting the same to be horizontally traversed, a slide on said guide beam provided with locating means and carrying a deflectably mounted motor-driven circular saw in such a manner that the saw can be tilted from a position for making a vertical cut into a position for making a horizontal cut, and support means on the front face of the frame for supporting a panel resting on the carriers, characterised in that said support means is in the form of an elevationally movable trellis comprising horizontal battens, said trellis being positively raisable in the plane of the trellis by motion transmitting means operable by the inward deflection of the motor-driven circular saw for making a horizontal cut, whenever the blade of the circular saw happens to be in elevational alignment with a batten of the trellis and could damage the same when making the intended horizontal cut.

2. A sawing jig according to claim 1, in which the motion transmitting means comprise a quadrant mounted on the slide carrying the circular saw and adapted to swivel about a vertical axis, said quadrant cooperating with a lifting finger in such a way that inward deflection of the motor-driven circular saw for making a horizontal cut will cause the lifting finger to lift a lifting bar which in turn raises the trellis whenever a batten happens to be located in the range of action of the blade of the circular saw.

3. A sawing jig according to claim 2, in which said lifting bar is provided on its side facing the lifting finger with projections spaced to conform with the relative spacing and elevational positions of the battens of the trellis, said lifting finger being adapted to engage the underside of said projections.

4. A jig according to claim 2, in which said lifting finger is provided at its bottom end with a retainer which in the position of the circular saw in readiness for performing a horizontal cut cooperates with a stop on the slide for retaining the lifting finger in inoperative position.

References Cited by the Examiner
UNITED STATES PATENTS
3,008,498  11/1961  Olson _____ 143—47

DONALD R. SCHRAN, *Primary Examiner.*